United States Patent
Storgaard Pedersen

(10) Patent No.: US 8,096,051 B2
(45) Date of Patent: Jan. 17, 2012

(54) METHOD OF LIFTING A WIND TURBINE NACELLE

(75) Inventor: Gunnar K. Storgaard Pedersen, Skjern (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 13/002,190

(22) PCT Filed: Nov. 13, 2009

(86) PCT No.: PCT/EP2009/065167
§ 371 (c)(1),
(2), (4) Date: Mar. 15, 2011

(87) PCT Pub. No.: WO2010/055142
PCT Pub. Date: May 20, 2010

(65) Prior Publication Data
US 2011/0239435 A1    Oct. 6, 2011

Related U.S. Application Data

(60) Provisional application No. 61/115,271, filed on Nov. 17, 2008.

(30) Foreign Application Priority Data

Nov. 17, 2008    (DK) ................................. 2008 01598

(51) Int. Cl.
*B21K 25/00*    (2006.01)
(52) U.S. Cl. ........ 29/889.21; 29/889.2; 29/889; 29/428; 29/281.5; 29/897.33; 414/589
(58) Field of Classification Search ............... 29/897.33, 29/889, 889.2, 889.21, 889.22, 428, 281.5; 414/589, 591
See application file for complete search history.

(56) References Cited

U.S. PATENT DOCUMENTS 6,648,571 B1 *  11/2003  Franzen et al. ............ 414/141.4
(Continued)

FOREIGN PATENT DOCUMENTS

DE    200 18 890    1/2002
(Continued)

OTHER PUBLICATIONS

Steffen Hostrup Larsen; 1st Technical Examination Report issued in Denmark priority application No. PA 2008 01598; Jun. 9, 2009; 5 pages; Denmark Patent and Trademark Office.

(Continued)

*Primary Examiner* — Sarang Afzali
(74) *Attorney, Agent, or Firm* — Wood, Herron & Evans, L.L.P.

(57) ABSTRACT

This invention relates to a method of lifting a wind turbine nacelle (1), the method comprising: arranging a first and second anchoring point (2,3) on each of two opposing sides of the nacelle (1), the first point (2) of each side being arranged below the center of gravity (4) of the nacelle (1) and the second point (3) of each side being arranged above the center of gravity (4), wherein one of said first and second anchoring point (2,3) of each side is immovably arranged, and wherein the other one of said first and second anchoring point (2,3) of each side is movably arranged; interconnecting said first and second anchoring point (2,3) on respective side of the nacelle (1) by means of one connecting element (5) per each of the two sides; connecting each of said connecting elements (5) to a hoisting means (11); adjusting the position of each of the movable anchoring points such that each of the connecting elements (5) is vertically aligned when lifting the nacelle (1) by the hoisting means (11).

12 Claims, 2 Drawing Sheets

U.S. PATENT DOCUMENTS

| | | | |
|---|---|---|---|
| 7,207,777 B2 * | 4/2007 | Bervang | 416/119 |
| 7,341,422 B1 * | 3/2008 | McCown et al. | 414/803 |
| 2007/0201972 A1 * | 8/2007 | Tsuji | 414/718 |
| 2008/0307647 A1 * | 12/2008 | Kessler | 29/889 |

FOREIGN PATENT DOCUMENTS

| | | |
|---|---|---|
| WO | 97/21621 | 6/1997 |
| WO | 2006/076920 | 7/2006 |

OTHER PUBLICATIONS

Andres De La Loma; International Search Report issued in international priority application No. PCT/EP2009/065167; Nov. 5, 2010; 3 pages; European Patent Office.

Unknown; partial English translation of German patent application DE 200 18 890, Jan. 24, 2002.

* cited by examiner

METHOD OF LIFTING A WIND TURBINE NACELLE

TECHNICAL FIELD

The present invention generally relates to a method of lifting a wind turbine nacelle by means of a crane.

BACKGROUND OF THE INVENTION

When lifting a wind turbine nacelle in order to place it on top of a wind turbine tower, a crane with a yoke and wires is normally used. The nacelle is transported to the site of the tower, after which the yoke is attached to the nacelle at four points, substantially one point at each corner of the nacelle, via wires, and the nacelle is lifted by the crane.

The yoke comprises a complex arrangement of hydraulics to be able to adjust the position of the nacelle during the lift, such that the nacelle is in the correct, horizontal, position when placed on the tower. The hydraulics of the yoke is also needed to attach the yoke to the four corners of the nacelle since the nacelle is often transported in a non-horizontal, inclining, position to save space. The yoke thus needs to be hydraulically tilted to reach the lower end of the inclined nacelle, after which the yoke is tilted back to give the nacelle a horizontal attitude.

The yoke described above is rather large and complex, and thus expensive.

SUMMARY OF THE INVENTION

In view of the above, an objective of the invention is to provide a method which simplifies and reduces the cost of lifting a wind turbine nacelle onto a wind turbine tower.

According to a first aspect, the present invention relates to a method of lifting a wind turbine nacelle, the method comprising: arranging a first and second anchoring point on each of two opposing sides of the nacelle, the first point of each side being arranged below the centre of gravity of the nacelle and the second point of each side being arranged above the centre of gravity, wherein one of said first and second anchoring point of each side is immovably arranged, and wherein the other one of said first and second anchoring point of each side is movably arranged; interconnecting said first and second anchoring point on respective side of the nacelle by means of one connecting element per each of the two sides; connecting each of said connecting elements to a hoisting means; adjusting the position of each of the movable anchoring points such that each of the connecting elements is vertically aligned when lifting the nacelle by the hoisting means.

By one of the two anchoring points of each of the two opposing sides being movable, and by one point being positioned above and the other one below the centre of gravity, each of the connecting elements may be positioned in relation to the centre of gravity of the nacelle such that the nacelle may be lifted at only two points, i.e. via the connecting element of each of the two opposing sides of the nacelle, instead of the traditional four points, without rotating when it is lifted. Thus, the means for connecting the nacelle to a hoisting means may be significantly simplified. There is e.g. no longer a need for a large four point yoke to be used. In fact, a yoke is no longer needed at all, since the connecting means may be connected directly to the hoisting means via converging wires. Also, there is no longer a need for any hydraulics in order to connect an inclining nacelle to the hoisting means since the hoisting means is only connected at one point per nacelle side.

It may, however, be convenient to connect the connecting elements to the hoisting means via a yoke. This yoke may be a simple two-point yoke with no hydraulics.

The connecting elements may be connected to the yoke via e.g. wires or chains, one per connecting element, i.e. one per opposing side of the nacelle, but it may be convenient to connect the connecting elements directly to the yoke, reducing the number of wires, or such, that need to be guided to avoid entanglement. Also, the less gap there is between the yoke and the nacelle, the higher a specific hoisting means may lift the nacelle, since the yoke may be lifted to the same height regardless of the gap to the nacelle below.

The movable anchoring points may be slidably arranged along a structure of the nacelle. By being slidable, the movable anchoring points may be slided to a convenient position in relation to the immovable anchoring points and the nacelle centre of gravity in accordance with the inventive method. The anchoring points may be continuously, i.e. steplessly, slidably adjustable to allow very precise positioning of the connecting elements in relation to the centre of gravity of the nacelle, or they may be step-wise slidable. The movable anchoring points may e.g. only be locked in specific, not stepless, positions, which may simplify the anchoring point design.

The movable anchoring points may be arranged in any part of the nacelle sides, but it may be convenient to arrange them in respective parts of a frame of the nacelle. If, for instance, the movable anchoring points are arranged in a casing material, the material may not have the structural strength necessary and may be torn. Depending on whether the movable anchoring points are intended to carry some, or even all, of the nacelle weight during lifting, it may be convenient to arrange them in a bearing structure of the nacelle.

The immovable anchoring points may be arranged in any part of the nacelle sides, but it may be convenient to arrange them in respective parts of the frame of the nacelle. If, for instance, the immovable anchoring points are arranged in a casing material, the material may not have the structural strength necessary and may be torn. Depending on whether the immovable anchoring points are intended to carry some, or even all, of the nacelle weight during lifting, it may be convenient to arrange them in a bearing structure of the nacelle.

The immovable anchoring points may thus be arranged in a bearing structure of the nacelle, allowing these anchoring points to carry most of the weight of the nacelle as the nacelle is lifted. The nacelle will thus not risk breaking from its own considerable weight. The bearing structure may be a part of the frame of the nacelle.

The bearing structure in which the immovable anchoring points may be arranged might be a cast iron structure, since such a structure may be strong enough to carry the weight of the nacelle. The cast iron structure may form an integral part of the frame of the nacelle, or may be joined to other parts of the nacelle frame.

In a specific embodiment, the immovable anchoring points may be arranged in a cast iron housing for a gear box of the wind turbine.

The connecting elements of the present invention may be any structural element able to connect the first and second anchoring points on each of the opposing sides of the nacelle. A connecting element may e.g. be a wire, a chain, a rod or a bar connecting the first anchoring point of a side of the nacelle with the second anchoring point of the same side of the nacelle. An advantage with using wires as connecting elements may be that wires are more easily handled, stored and transported since they may be flexible.

The anchoring points may be any means that allows a connecting element to be connected thereto. A simple and easy to use type of anchoring point is a lifting eye. Thus, it may be convenient that at least one of the anchoring points is a lifting eye. Especially, it may be convenient that the immovable anchoring points are lifting eyes.

The first anchoring points may be those anchoring points which are immovably arranged. The movably arranged anchoring points will in that case be the second anchoring points, arranged above the centre of gravity of the nacelle.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

With the term "nacelle" is generally meant a housing intended to be placed on a wind turbine tower. The nacelle may include e.g. a frame to define a machine housing volume and/or provide a bearing structure of the nacelle, a casing to provide closed external surfaces of the nacelle, a gear box, a transmission and a generator, and a wind turbine rotor may be connected to the nacelle.

As used in this description, a "side" of a nacelle is any external plane of the nacelle and defined by the extension of the nacelle. The side may be flat, if e.g. the nacelle is a rectangular solid, or curved, as is often the case to make the nacelle more streamlined. "Opposing sides" of the nacelle are two sides, between which the centre of gravity of the nacelle is positioned.

The hoisting means may be any type of hoisting means able to lift a wind turbine nacelle, such as a winch or crane. The hoisting means may be separate from the wind turbine, e.g. standing on the ground, or on a boat if the wind turbine is off-shore, beside the wind turbine tower, or it may be an on-board hoisting means such as a winch or crane attached to the top of the tower.

Figure 1:
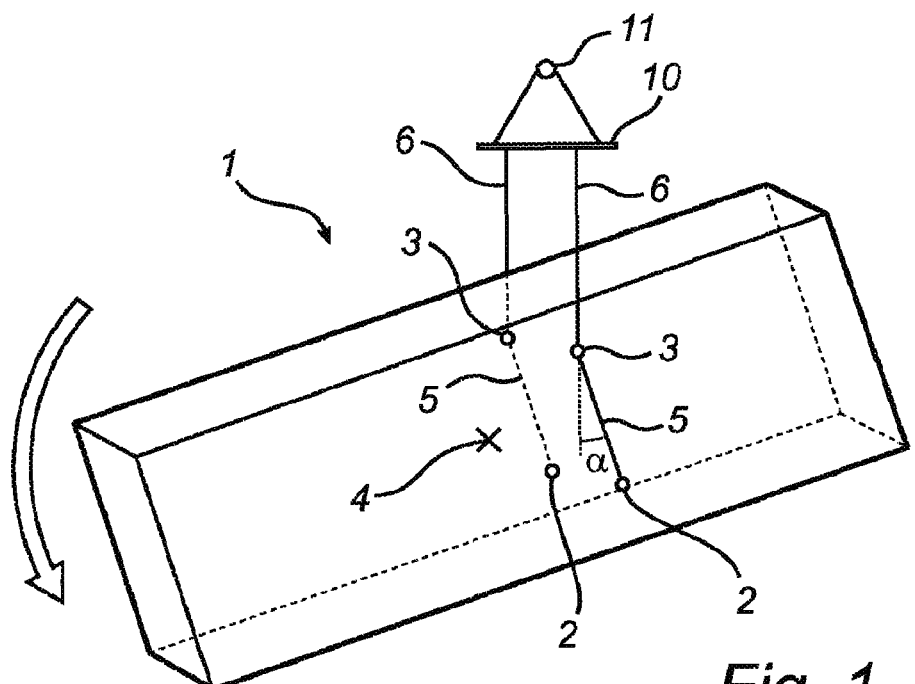
FIG. 1 is a schematic perspective view of a wind turbine nacelle being lifted. The figure is included to illustrate a problem solved by the present invention.

FIG. 1 illustrates a nacelle 1 being lifted in accordance with a new method, which method is, however, not according to the present invention.

A first and a second anchoring point 2 and 3 are arranged on each of two opposing sides of the nacelle, wherein, prior to the lift, the first anchoring points 2 are arranged below the centre of gravity 4, marked with an "x" in the figure, and the second anchoring points 3 are arranged above the centre of gravity 4. The first and second anchoring points 2 and 3 of each side are interconnected by connecting elements 5, one connection element 5 per side of the two opposing sides of the nacelle 1 such that one connecting element 5 connects the first anchoring point 2 of one of the sides with the second anchoring point 3 of that same side and one other connecting element 5 connects the first anchoring point 2 of the other of the sides with the second anchoring point 3 of that other side.

The connecting elements 5 are connected, at the respective second anchoring points 3, to a hoisting means 11 via two wires 6 and a yoke 10, one wire 6 being connected to the connecting element 5 of one of the two opposing sides and the other wire 6 being connected to the connecting element 5 of the other one of the two opposing sides. The nacelle 1 may then be lifted by the hoisting means 11 in two points, i.e. in a two-point lift, via the two wires 6.

According to FIG. 1, the positions of the anchoring points 2 and 3 have not been correlated to the centre of gravity 4 of the nacelle 1, why the nacelle 1 will tip, or rotate, as illustrated by the arrow in FIG. 1, when the nacelle 1 is lifted by the hoisting means 11. The nacelle 1 will thus, according to the method not of the invention illustrated in FIG. 1, be two-point lifted to e.g. a wind turbine tower in a far from horizontal position, rendering mounting the nacelle on the tower much more difficult, or impossible. Due to the anchoring points 2 and 3 not being correctly correlated to the nacelle 1 centre of gravity 4, the connecting means 5 will not be vertically aligned during lifting of the nacelle 1 by the hoisting means 11. Rather, the connecting means 5 will be at an angle alfa ("α") to a vertical axis during lifting.

Thus, the method of FIG. 1 alleviates problems with the prior art by allowing use of a simpler two-point lifting method, removing the need for the large and complex yoke of prior art, but the method of FIG. 1 is not functional for the purpose of lifting a nacelle 1 to the top of a wind turbine tower since the nacelle 1 is rotated to a substantially non-horizontal, or even almost vertical, position during lifting.

Figure 2:
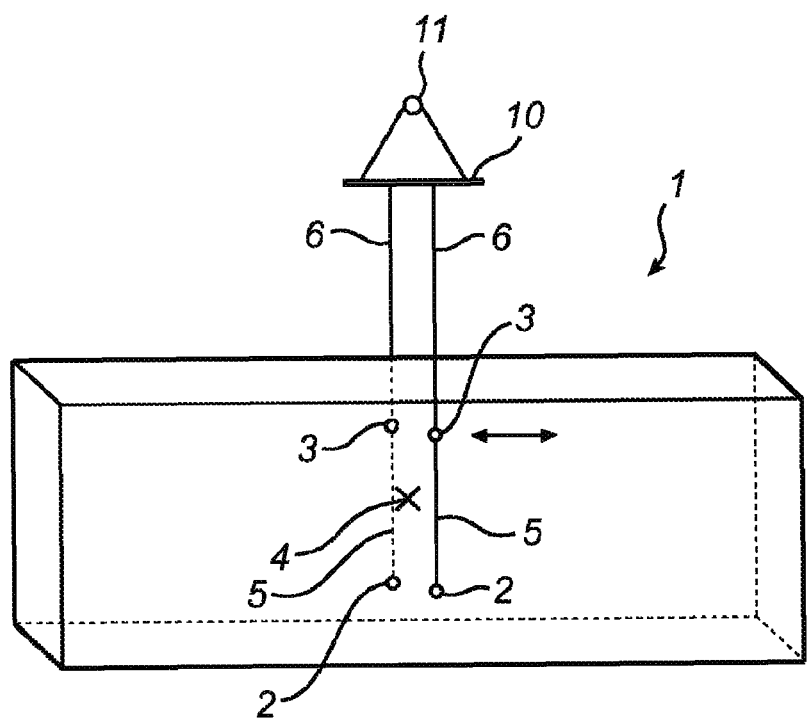
FIG. 2 is a schematic perspective view of a wind turbine nacelle being lifted according to the present invention.

FIG. 2 illustrates a nacelle 1 being lifted in accordance with the present invention.

A first and a second anchoring point 2 and 3 are arranged on each of two opposing sides of the nacelle 1, wherein the first anchoring points 2 are arranged below the centre of gravity 4, marked with an "x" in the figure, and the second anchoring points 3 are arranged above the centre of gravity 4. The first and second anchoring points 2 and 3 of each side are interconnected by connecting elements 5, one connection element 5 per side of the two opposing sides of the nacelle 1 such that one connecting element 5 connects the first anchoring point 2 of one of the sides with the second anchoring point 3 of that same side and one other connecting element 5 connects the first anchoring point 2 of the other of the two sides with the second anchoring point 3 of that other side.

According to this specific embodiment of the present invention, the first anchoring points 2 are immovably arranged in a bearing structure of the nacelle 1. The second anchoring points 3 are movably arranged in the nacelle 1 such that they may be moved sideways, i.e. in a longitudinal direction of the nacelle illustrated by the double headed arrow in FIG. 2, thus allowing adjustment of the positions of the second anchoring points 3 in view of the respective positions of the first, immovable, anchoring points 2 and the nacelle 1 centre of gravity 4 such that the nacelle 1 will not rotate during lifting.

The connecting elements 5 are connected, at the respective second anchoring points 3, to a hoisting means 11 via two wires 6 and a yoke 10, one wire 6 being connected to the connecting element 5 of one of the two opposing sides and the other wire 6 being connected to the connecting element 5 of the other one of the two opposing sides. The nacelle 1 may then be lifted by the hoisting means 11 in two points, i.e. a two-point lift, via the two wires 6.

Since the movably arranged anchoring points 3 have been positioned with due consideration to the centre of gravity 4 of the nacelle 1, the nacelle 1 will not start to rotate as it is lifted. Instead, the nacelle 1 will be lifted in balance in a highly controlled fashion and in a substantially horizontal position. Specifically, the connecting elements 5 will be vertically aligned during the lift. Depending on how much the movably arranged anchoring points 3 need to be horizontally moved in respect of the respective immovably arranged anchoring point 2 of each side, the nacelle 1 might not be perfectly horizontal during the lift, but the connecting elements 5 will still be vertical.

Since the first, immovable, anchoring points 2 of this embodiment of the invention are arranged in a bearing structure of the nacelle 1, these first anchoring points 2 may be allowed to carry most, or all, of the weight of the nacelle 1 during the lift.

Figure 3:
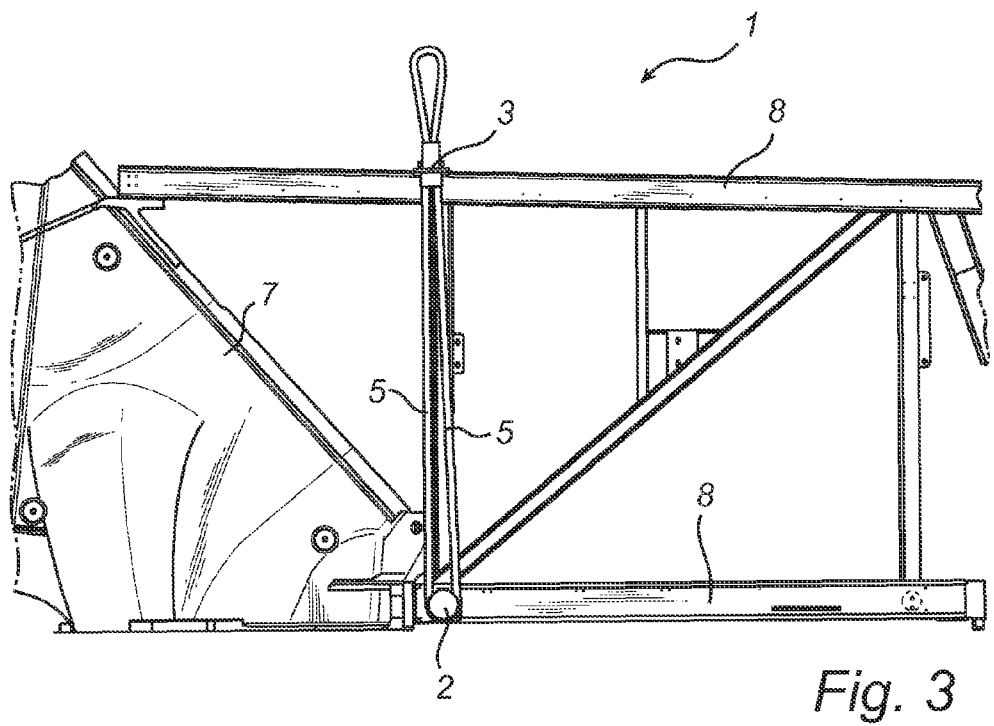
FIG. 3 is a schematic side view of a connecting element connecting anchoring points of a nacelle side, according to the present invention.

FIG. 3 illustrates a side of a wind turbine nacelle 1. A frame of the nacelle 1, which frame is a bearing structure of the nacelle 1, comprises a cast iron housing 7 for a gear box as well as a plurality of metal beams 8. A first anchoring point 2 is immovably arranged in the frame at the cast iron housing 7, and a second anchoring point 3 is movably arranged in the frame at a beam 8. A connecting element 5, here in the form of a looped, or doubled, wire, interconnects the first anchoring point 2 and the second anchoring point 3.

The first, immovable, anchoring point 2 is arranged to carry most of the weight of the nacelle 1.

Figure 4:
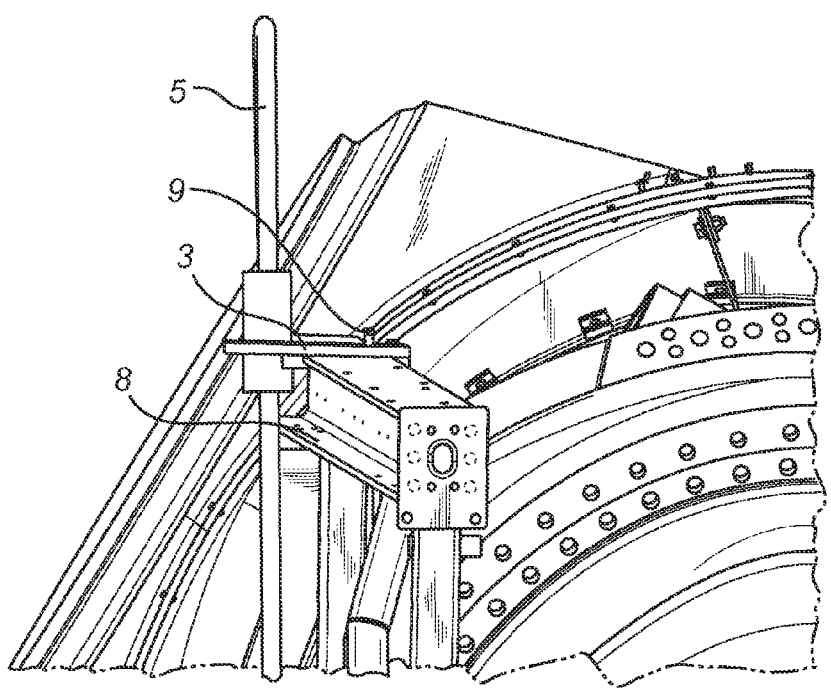
FIG. 4 is a schematic perspective view of a slidably movable anchoring point of a frame of the nacelle of FIG. 3, according to the present invention.

With reference to FIG. 4, the second, movable, anchoring point 3 is arranged slidable along the essentially horizontal beam 8 and may by means of e.g. a pin 9 and holes in the beam 8 be indexed to different horizontal positions longitudinally along the beam 8. The skilled man will appreciate that the pin 9 and/or the holes in the beam 8 may be substituted for any other indexation means.

The connecting element 5 of the embodiment of the invention disclosed in FIGS. 3 and 4 extend above the second anchoring point 3 and there forms a loop, or eye, to which e.g. a wire 6 or a yoke 10 may be connected for lifting the nacelle 1 by means of a hoisting means 11.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of lifting a wind turbine nacelle, the method comprising:
    arranging a first and second anchoring point on each of two opposing sides of the nacelle, the first point of each side being arranged below the centre of gravity of the nacelle and the second point of each side being arranged above the centre of gravity,
    wherein the first anchoring point of each side is immovably arranged, and
    wherein the second anchoring point of each side is movably arranged;
    interconnecting the first and second anchoring point on respective sides of the nacelle by means of a connecting element per each of the two sides;
    connecting each of the connecting elements to a hoisting means; and
    adjusting the position of each of the movable anchoring points such that each of the connecting elements is vertically aligned when lifting the nacelle by the hoisting means.

2. The method of claim 1, wherein the immovable anchoring points are arranged in a bearing structure of the nacelle.

3. The method of claim 2, wherein the bearing structure is a cast iron structure.

4. The method of claim 2, wherein the bearing structure is a housing for a gear box.

5. The method of claim 1, wherein the connecting elements are connected to the hoisting means via a yoke.

6. The method of claim 5, wherein each of the connecting elements is directly connected to the yoke.

7. The method of claim 1, wherein the movable anchoring points are slidable along a structure of the nacelle.

8. The method of-claim 1, wherein the movable anchoring points are arranged in a frame of the nacelle.

9. The method of-claim 1, wherein the immovable anchoring points are arranged in a frame of the nacelle.

10. The method of claim 1, wherein the immovable anchoring points are arranged to carry most of the weight of the nacelle during lifting of the nacelle.

11. The method of claim 1, wherein the connecting elements are wires.

12. The method of claim 1, wherein at least one of the anchoring points is a lifting eye.

* * * * *